(12) United States Patent
Bamidi

(10) Patent No.: US 12,302,090 B2
(45) Date of Patent: May 13, 2025

(54) RADIO RECEIVER DEVICES

(71) Applicant: Nordic Semiconductor ASA, Trondheim (NO)

(72) Inventor: Ravi Kiran Bamidi, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 0 days.

(21) Appl. No.: 18/531,363

(22) Filed: Dec. 6, 2023

(65) Prior Publication Data
US 2024/0196208 A1    Jun. 13, 2024

(30) Foreign Application Priority Data
Dec. 7, 2022 (GB) .................................... 2218396

(51) Int. Cl.
*H04W 4/38* (2018.01)
*H04W 12/03* (2021.01)

(52) U.S. Cl.
CPC .................. *H04W 12/03* (2021.01)

(58) Field of Classification Search
CPC .......... H04W 12/03; H04W 4/38; H04W 4/80
See application file for complete search history.

(56) References Cited

U.S. PATENT DOCUMENTS

| | | | |
|---|---|---|---|
| 2017/0026778 A1* | 1/2017 | Yamada | H04W 12/08 |
| 2018/0172664 A1* | 6/2018 | Love | G16H 40/67 |
| 2018/0270876 A1* | 9/2018 | Ding | H04L 5/0055 |

FOREIGN PATENT DOCUMENTS

| | | |
|---|---|---|
| CN | 112491833 A | 3/2021 |
| CN | 113904958 A | 1/2022 |
| WO | WO 2022/052859 A1 | 3/2022 |

OTHER PUBLICATIONS

Dworkin, "Recommendation for Block Cipher Modes of Operation: The CCM Mode for Authentication and Confidentiality," *National Institute of Standard and Technology, Technology Administration, U.S. Department of Commerce*, NIST Special Publication 800-38C, Jul. 20, 2007, 27 pages.

IPO Search Report under Section 17 for Great Britain Patent Application No. 2218396.6, dated Jun. 6, 2023, 4 pages.

* cited by examiner

*Primary Examiner* — Michael T Vu
(74) *Attorney, Agent, or Firm* — Klarquist Sparkman, LLP

(57) ABSTRACT

A method of operating a radio receiver device is provided. The method comprises receiving a radio signal comprising an encrypted advertising packet, said advertising packet comprising a header portion and a payload portion comprising one or more encrypted payload structures. A decryption operation is performed using a decryption key on a first section of the payload portion and a length of a first payload structure of the payload portion indicated by the decryption result is determined. The indicated length of the first payload structure is compared to a set of feasible lengths based at least partially on the length of the payload portion. If the length of the first payload structure is not in the set of feasible lengths for the first payload structure, it is determined that the decryption key does not correspond to the advertising packet.

21 Claims, 3 Drawing Sheets

RADIO RECEIVER DEVICES

CROSS REFERENCE TO RELATED APPLICATION

This application claims priority from Great Britain Application No. 2218396.6, filed Dec. 7, 2022, which application is incorporated herein by reference in its entirety.

BACKGROUND OF THE INVENTION

The present invention relates to radio receiver devices and methods of operating radio receiver devices.

Some wireless communication networks involve a first wireless device advertising its presence to other nearby wireless devices by broadcasting so-called advertising packets. Other devices can detect these packets and, if desired, form a wireless connection with the first device for two-way data transfer. One example of a wireless communication standard that uses advertising packets is Bluetooth Low Energy (BLE).

Typically, advertising packets include identifying information to allow devices listening for advertising packets to find and connect to a specific advertising device (e.g. of potentially multiple devices advertising simultaneously). For instance, a user in a busy train station a user may seek to connect their mobile phone specifically to their set of headphones. A device can review the identifying information from each detected advertising packet and quickly dismiss those that do not relate to the specific device required.

It may be desirable for some or all of the data included in an advertising packet to be encrypted, e.g. for security or privacy reasons. For instance, a decryption key could be shared in advance and/or out-of-band between a group of trusted devices, and then used to decrypt advertising packets received from one of those devices, whilst other devices are not able to recover the information in the advertising packet.

However, encrypting advertising packets may inherently increase the processing burden associated with detecting and acting on said packets. This problem may be amplified when there are multiple devices broadcasting encrypted advertising packets simultaneously, because a given device listening for advertising packets may attempt to decrypt all detected packets despite only having the appropriate key for a limited number of the packets.

An improved approach may be desired.

SUMMARY OF THE INVENTION

According to a first aspect of the present invention there is provided a method of operating a radio receiver device, the method comprising:
  receiving a radio signal comprising an encrypted advertising packet, said advertising packet comprising a header portion and a payload portion comprising one or more encrypted payload structures;
  determining a length of said payload portion using information contained in the header portion;
  performing a decryption operation using a decryption key on a first section of the payload portion to produce a decryption result for the first section;
  determining a length of a first payload structure of the payload portion indicated by the decryption result for the first section;
  comparing the length of the first payload structure indicated by the decryption result for the first section to a set of feasible lengths for the first payload structure, said set of feasible lengths being based at least partially on the length of the payload portion; and
  if the length of the first payload structure indicated by the decryption result for the first section is not in the set of feasible lengths for the first payload structure, determining that the decryption key does not correspond to the advertising packet.

Thus, it will be appreciated by those skilled in the art that, by making use of length information contained in the packet, radio receiver devices operated according to embodiments of the invention may be able to efficiently identify encrypted advertising packets for which a radio receiver device does not have the corresponding key (i.e. the appropriate key for decrypting the packet). Packets that are not intended for the radio receiver device may be quickly dismissed using only a first section of the payload portion, without needing to attempt decryption (and possibly authentication) of the entire packet. Similarly, a radio receiver device which stores multiple decryption keys may be able to discover the appropriate key for a given packet more quickly, because keys that do not correspond to the packet can quickly be dismissed without needing to attempt full decryption.

If the decryption key does not correspond to the advertising packet, the decryption result for the first section obtained using the key will not correspond to the plaintext of the first payload structure (i.e. decryption will be unsuccessful). As such, the length of the first payload structure indicated by the decryption result may just be a random value. Because only a particular set of lengths for the first payload structure is even feasible given the known overall length of the payload portion, the radio receiver device can thus dismiss a particular key as being incorrect for the packet if the indicated length of the first payload portion is not feasible, without needing to attempt to decrypt the rest of the packet. In many implementations the likelihood of a random decryption result indicating a feasible length may be relatively low. This can make scanning for encrypted advertising packets more efficient and/or reduce the processing resources the radio receiver device needs to allocate to advertising packet scanning.

The length of the first payload structure may be indicated by a particular value in the decryption result. For instance, the value at a position of the decryption result that would, if the key were correct, be the position of a structure length field in the first payload structure. In some embodiments, this is the first value in the decryption result. The value of a structure length field may equal or indicate (e.g. with a known offset) the length of its payload structure. For instance, in the Bluetooth specification, the value of a structure length field of a payload structure may equal the length of the rest of the payload structure in bytes (i.e. excluding the one-byte length of the structure length field itself).

The set of feasible lengths for the first payload structure may include any length for the first payload structure that is possible based on other information known to the radio receiver portion. For instance, the set of feasible lengths may include only lengths that are less than or equal to a maximum structure length. The maximum structure length may be the length of the payload portion, because the radio receiver device may safely conclude that the first payload structure cannot be longer than the entire payload portion. The maximum structure length may be defined relative to the length of the payload portion, e.g. to account for one or more expected additional fields taking up a portion of the payload portion which can't therefore be used for the first payload structure. For instance, the maximum structure length may be equal to the length of the payload portion minus a length of one or more expected additional payload fields (e.g. header or tag fields). In a set of embodiments, the maximum structure length is equal to the length of the payload portion minus one or more of the group containing: a payload header length, a randomizer length and an authentication tag length (e.g. a message integrity code or MIC length).

In some embodiments, additionally or alternatively, the set of feasible lengths for the first payload structure may include only lengths that are equal to or above a minimum structure length. The minimum structure length may be a minimum possible length for any data structure (e.g. the minimum structure length may be one bit or one octet), or it may be a minimum acceptable length for an advertising payload structure (e.g. defined by a communication protocol used by the radio receiver device). For instance, a communication protocol used by the radio receiver device may define a minimum advertising payload structure length of four octets, allowing the radio receiver device to discard safely as invalid a decryption result for the first section which indicates a length for the first payload structure that is less than four octets.

In a set of embodiments, the set of feasible lengths for the first payload structure includes or consists of a range of feasible lengths. The range of feasible lengths may extend from a minimum possible structure length (e.g. one octet) to a maximum possible structure length (e.g. the length of the payload portion). In some embodiments the set of feasible lengths for the first payload structure may include specific feasible lengths and/or exclude specific unfeasible lengths (e.g. based on expected packet formatting).

The header portion may be unencrypted, e.g. facilitating the determination of the length of the payload portion.

In a set of embodiments, the decryption operation uses a symmetric decryption operation, i.e. in which the same key is used for encryption and decryption. For instance, the decryption operation may be based on the Advanced Encryption Standard (AES). The advertising packet may be correspondingly encrypted with symmetric-key encryption.

In some embodiments, the decryption operation comprises a block decryption operation (i.e. operable on a block of ciphertext with a particular length). In such embodiments the payload portion of the advertising packet may comprise a plurality of encryption blocks. The encryption blocks may be equally sized. The first section of the payload portion may be a first encryption block.

In a set of embodiments, the decryption operation uses cipher-block chaining (CBC). In such embodiments the successful decryption of a section in the ciphertext (i.e. the payload portion) may rely on successful decryption of earlier sections (e.g. earlier encryption blocks). CBC may be used for an authentication operation separately to decryption.

In a set of embodiments, the decryption operation uses counter mode operation (CTR), in which a successive values of a counter are used when decrypting corresponding successive sections (e.g. blocks) of the payload portion.

In some embodiments, the decryption operation may utilise additional cryptographic information as well as a decryption key. For instance the decryption operation may also use an initialization vector (IV). In some such embodiments a set of decryption security material (e.g. a key-IV pair) may be used in place of only the decryption key.

In a set of embodiments, the decryption operation applies one or more parts of Advanced Encryption Standard—Counter with cipher block chaining message authentication Mode (AES-CCM).

The one or more encrypted payload structures of the payload portion may have varying lengths, e.g. depending on the data contained in the payload structure. In relevant embodiments, the length(s) of the encrypted payload structure(s) in the advertising packet may be unrelated to the size of the first section used to produce the decryption result. For instance, the first section may correspond to a encryption block with a fixed length (e.g. 128 bits), whereas the encrypted payload structures may vary in length from 8 bits or less to 2000 bits or more. The first section may therefore contain part or all of one or multiple payload structures. In other words, the first section may contain one or more entire encrypted payload portions, parts of one or more encrypted payload portions or a mixture of the two. For instance, the first section of the payload portion may comprise an entire encrypted first payload structure and part of an encrypted second payload structure.

In response to a determination that the decryption key does not correspond to the advertising packet, the radio receiver device may disregard the packet with no or minimal further processing (e.g. the radio receiver device may conclude that it is not the intended recipient of the incoming advertising packet). For instance, if the radio receiver device has available only a single decryption key (e.g. stored in a local or remote memory), it can conclude immediately from a determination that the decryption key does not correspond to the advertising packet that it will not be able to decrypt the incoming packet and it can be safely disregarded without committing further processing resources.

However, in some embodiments, the radio receiver device may have access to a plurality of decryption keys, e.g. for communicating with different devices. In a set of embodiments, in response to determining that the (first) decryption key does not correspond to the advertising packet, the method may further comprise:

performing a decryption operation using a second decryption key on the first section of the payload portion to produce a second decryption result for the first section;
 determining a length of the first payload structure of the payload portion indicated by the second decryption result for the first section;
 comparing the length of the first payload structure indicated by the second decryption result for the first section to the set of feasible lengths for the first payload structure; and
 if the length of the first payload structure indicated by the second decryption result for the first section is not within the set of feasible lengths, determining that the second decryption key does not correspond to the advertising packet.

More generally, the method may comprise checking whether one or more further decryption keys corresponds to the advertising packet. This process may be repeated until all available decryption keys have been tested (or until the correct decryption key is found). If decryption results of all available decryption keys indicate a length of the first payload structure that is not within the set of feasible lengths, the advertising packet may be dismissed (i.e. disregarding the packet with no or minimal further processing).

As explained above, if the indicated length of the first payload structure is not feasible, the radio receiver device can quickly dismiss the decryption key as not corresponding to the advertising packet. However, an incorrect decryption key may still sometimes return a decryption result which indicates a feasible length for the first payload structure, due to the random nature of the decryption process. In such cases further investigation may be needed before the radio receiver device can determine whether or not the decryption key corresponds to the advertising packet. As such, if the length of the first payload structure indicated by the first decryption result is within the set of feasible lengths for the first payload structure, the method may comprise checking whether the decryption key produces a feasible indication of the length of one or more other payload structures.

In a set of embodiments, if the length of the first structure indicated by the first decryption result is within the set of feasible lengths for the first payload structure, the method comprises:
  identifying a second payload structure of the payload portion;
  determining a length of the second payload structure indicated by a decryption result;
  comparing the length of the second payload structure indicated by the decryption result to a set of feasible lengths for the second payload structure, said set of feasible lengths being based at least partially on the length of the payload portion; and
  if a length of the second payload structure indicated by the decryption result is not within the set of feasible lengths for the second payload structure, determining that the decryption key does not correspond to the advertising packet.

Identifying a second payload structure and checking whether its indicated length is feasible may assist in determining quickly whether the decryption key corresponds to the advertising packet. Probability dictates that a non-corresponding decryption key which, by chance, returns a feasible indicated length for the first payload structure is unlikely to also return a feasible indicated length for the second payload structure. Comparing the indicated length of the second payload structure to a set of feasible lengths for the second payload structure can thus enhance the early detection of invalid decryption keys. In other words, by checking the feasibility of a further structure, the radio receiver device may be more likely to identify an incorrect key or conversely can be more confident in the correctness of the key (i.e. if the length is feasible).

The radio receiver device may identify the second payload structure based on the indicated length of the first payload structure (i.e. by moving to a position in a buffer corresponding to the end of the first payload structure). Of course, if the decryption key does not correspond to the advertising packet, this indicated length (and thus the identified second payload structure) may not bear any relevance to actual payload structures in the unencrypted packet.

In some embodiments, part or all of the second payload structure (e.g. identified using the indicated length of the first payload structure) may be within the decryption result for the first section. For instance, the first section may be a first encryption block, and the indicated length of the first payload structure may be less than that of the first encryption block. Some embodiments may involve determining a length of the second payload structure indicated by the decryption result for the first section (i.e. the length of the second payload structure may be indicated by the decryption result for the first section). In other words, the same decryption result may be used to determine indicated lengths for the first and second payload structures.

However, part or all of the second payload structure identified using the indicated length of the first payload structure may not be within the decryption result for the first section (e.g. because the first section is a first encryption block, and the indicated length of the first payload structure is equal to or longer than the first encryption block). Thus, in some embodiments, the method comprises performing a decryption operation using the decryption key on a second section of the payload portion to produce a decryption result for the second section. Some such embodiments may comprise determining a length of the second payload portion indicated by the decryption result for the second section (i.e. the length of the second payload structure may be indicated by the decryption result for the second section). In other words, the method may comprise determining a length of the second payload structure indicated by the decryption result for the second section.

The second section may be adjacent the first section (e.g. it may comprise the next encryption block). Alternatively, the second section may be separated from the first section, e.g. a separate encryption block.

The set of feasible lengths for the second payload structure may be the same as the set of feasible lengths for the first payload structure, because the first and second payload structures are subject to at least some of the same inherent length constraints (e.g. each payload structure must be shorter than the entire payload portion). However, in a set of embodiments the set of feasible lengths for the second payload structure is based at least partially on the length of the first payload structure indicated by the decryption result for the first section. For instance, the set of feasible lengths for the second payload structure may comprise a maximum length equal to a maximum length for the first payload structure minus the length of the first payload structure indicated by the decryption result for the first section (e.g. how much of the payload portion is left for the second payload structure). Introducing additional constraints on the feasible length of the second payload structure may further increase the likelihood of a non-corresponding key being detected (because a random result for the length is less likely to be in the feasibly set).

If the second indicated length is also feasible, this process may be repeated for further sections of the payload portion, with the likelihood of an invalid key returning feasible lengths becoming increasingly small with each repetition. Generally, in a set of embodiments, if the length of the first payload structure indicated by the decryption result for the first section is within the set of feasible lengths for the first payload structure, the method comprises:
  identifying one or more further payload structures of the payload portion determining lengths of said one or more further payload structures of the payload portion indicated by one or more decryption results produced using the decryption key;
  comparing the lengths of the one or more further payload structures indicated by the one or more decryption results to one or more respective sets of feasible lengths for said one or more further payload structures, said sets of feasible lengths being based at least partially on the length of the payload portion; and
  if a length of a further payload structure indicated by a decryption result for a respective further section is not within a respective set of feasible lengths, determining that the decryption key does not correspond to the advertising packet.

As explained above, identifying further payload structures may use indicated lengths of previous payload structures. Identifying further payload structures may involve performing one or more further decryption operations on one or more further sections of the payload portion.

To avoid unnecessary processing, the further payload structures may be processed in turn, with the determination that the key does not correspond to the advertising packet occurring if and when an unfeasible length for a payload structure is found.

In embodiments in which the radio receiver device has access to a plurality of decryption keys, this process (i.e. checking if the indicated length of the first and possibly further payload structures is feasible) may be repeated for each of the keys in turn. If all keys return an unfeasible length for a payload structure, the radio receiver device may disregard the packet with no or only minimal further processing.

Of course, if a decryption key checked by the radio receiver device does correspond to the advertising packet (i.e. it is the correct key for decrypting the packet), the indicated length of each payload structure will be feasible because the payload structure(s) will have been decrypted successfully. In a set of embodiments, if every indicated payload structure length produced using a given decryption key is feasible (i.e. if every length is in its respective set of feasible lengths), the radio receiver device may determine that the decryption key corresponds to the advertising packet.

In response to determining that a decryption key corresponds to the advertising packet, the radio receiver device may proceed to process and react to the contents of the advertising packet accordingly (e.g. by establishing a connection with a radio device that broadcast the advertising packet). In some embodiments, in response to determining that a decryption key corresponds to the advertising packet, the radio receiver device may carry out one or more additional cryptographic processes for the advertising packet, such as a validation or authentication process (e.g. before processing the contents of packet).

The invention extends to computer software that, when executed by a radio receiver device, causes said radio receiver device to perform the method disclosed herein. The radio receiver device may comprise a memory storing said software. The radio receiver device may comprise a processor arranged to execute said software.

According to a second aspect of the present invention there is provided a radio receiver device arranged:
  to receive a radio signal comprising an encrypted advertising packet, said advertising packet comprising a header portion and a payload portion comprising one or more encrypted payload structures;
  to determine a length of said payload portion using information contained in the header portion;
  to perform a decryption operation using a decryption key on a first section of the payload portion to produce a first decryption result for the first section;
  to determine a length of a first payload structure of the payload portion indicated by the decryption result for the first section;
  to compare the length of the first payload structure indicated by the decryption result for the first section to a set of feasible lengths for the first payload structure, said set of feasible lengths based at least partially on the length of the payload portion; and
  if the length of the first payload structure indicated by the first decryption result is not within the set of feasible lengths for the first payload structure, to determine that the decryption key does not correspond to the advertising packet.

The radio receiver device may comprise a memory storing one or more decryption keys. This may be the same as a memory storing software or may be a separate keystore.

The radio receiver device may comprise a frontend portion (e.g. an analogue frontend portion) arranged to receive and sample the radio signal, i.e. to produce a bit sequence corresponding to the advertising packet. The frontend portion may comprise one or more ADCs, mixers, filters, amplifiers and/or baluns.

The radio receiver device may comprise a buffer in which the advertising packet is stored.

The radio receiver device may comprise a radio transceiver device (i.e. able to transmit and receive radio signals).

It will be appreciated that the approach disclosed herein may be advantageously applied for a wide variety of radio signals and radio receiver device hardware. However, in a set of embodiments, the radio signal is a Bluetooth radio signal, e.g. a Bluetooth Low Energy (BLE) signal. The radio receiver device may be a Bluetooth device (e.g. a BLE device).

Features of any aspect or embodiment described herein may, wherever appropriate, be applied to any other aspect or embodiment described herein. Where reference is made to different embodiments, it should be understood that these are not necessarily distinct but may overlap. It will be appreciated that all of the preferred features of the method according to the first aspect described above may also apply to the other aspects of the invention.

BRIEF DESCRIPTION OF THE DRAWINGS

One or more non-limiting examples will now be described, by way of example only, and with reference to the accompanying figures in which.

DETAILED DESCRIPTION

Figure 1:
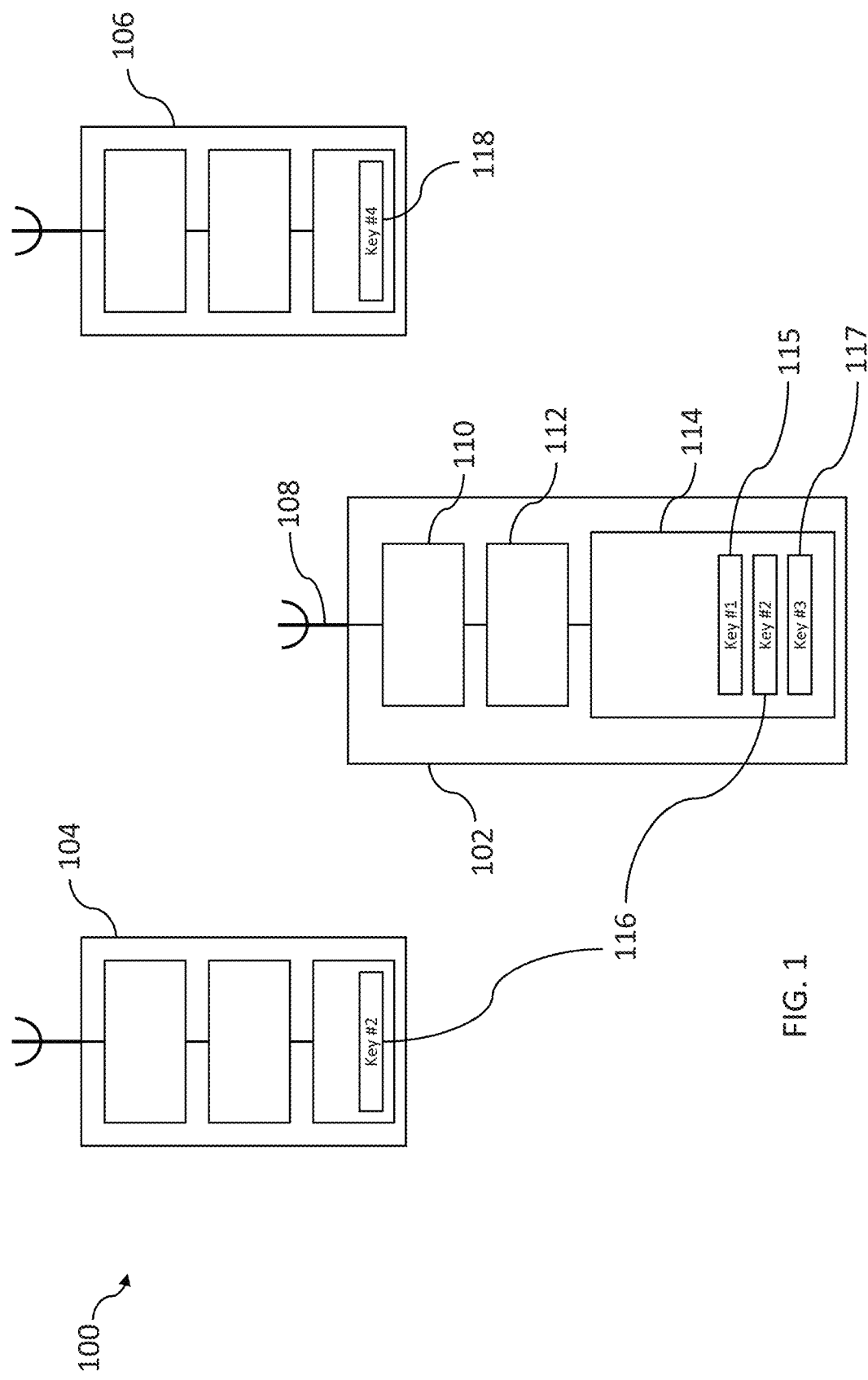
FIG. 1 shows a radio communication system according to an embodiment of the invention.

FIG. 1 shows a radio communication system 100 comprising a first radio transceiver device 102, a second radio transceiver device 104, and a third radio transceiver device 106. The first radio transceiver device 102 is a Bluetooth low-energy (BLE) central device listening for advertising packets. The second and third radio transceiver devices 104, 106 are BLE peripheral devices which broadcast encrypted advertising packets, encrypted as described below using an Advanced Encryption Standard—Counter with cipher block chaining message authentication Mode (AES-CCM) method.

The first radio transceiver device 102 comprises an antenna 108, a front-end portion 110, a processor 112 and a memory 114. The antenna 108 detects RF signals and forwards these to the front-end portion 110, which handles analogue reception processes such as demodulation, demultiplexing and sampling. The front-end portion 110 may comprise one or more ADCs, mixers, filters, amplifiers and/or baluns. The processor 112 executes software stored on the memory 114 to process and act on the output from the front-end portion 110.

The second and third radio transceiver devices 104, 106 also comprise respective antennas, front-end portions, processors and memories.

The first and second radio transceiver devices 102, 104 share in advance a symmetric cryptographic key 116. The second radio transceiver device 104 uses this key to encrypt advertising packets, and the first radio transceiver device 102 can use the same key to decrypt these advertising packets. The third radio transceiver device 106 uses a different cryptographic key 118 to encrypt its advertising packets, and this is not known to the first radio transceiver device 102. The first radio transceiver device 102 actually stores a plurality of cryptographic keys 115, 116, 117 in the memory 114, for use with different advertising devices.

In practice, when AES-CCM encryption is used, the first and second radio transceiver devices 102, 104 also share in advance an initialisation vector (IV), and a correct key-IV pair is required for proper decryption and authentication. However, the IV is omitted from the description below for brevity. References to "a cryptographic key" below may be understood to represent a key-IV pair.

Figure 2A:
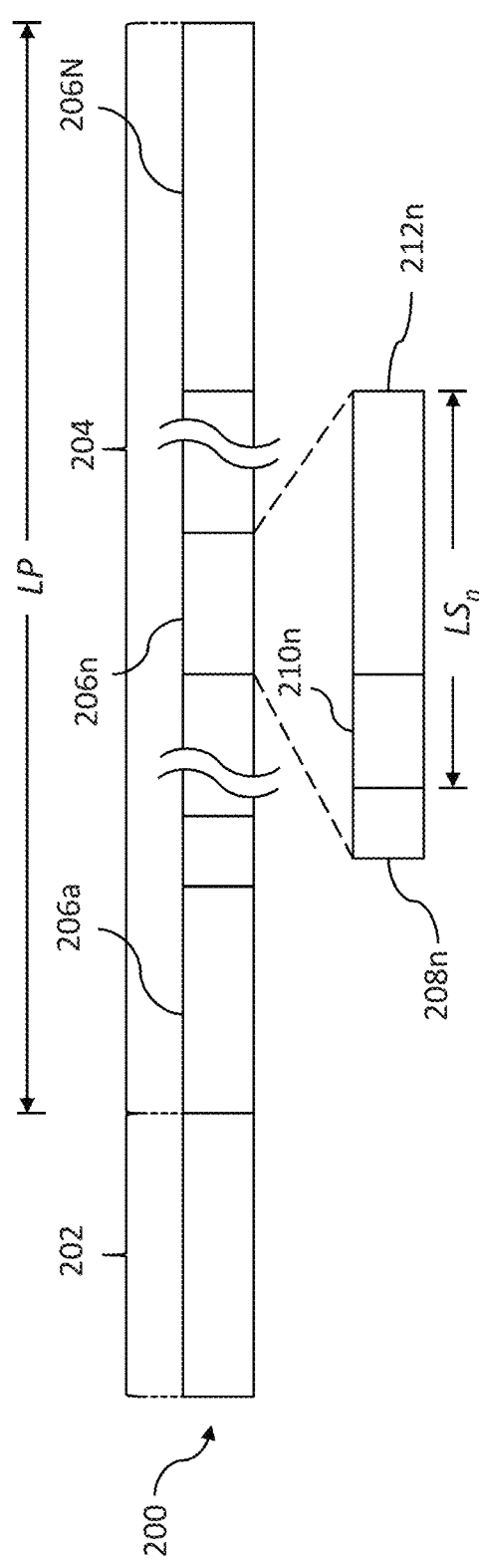
FIGS. 2A and 2B show an advertising packet for use in embodiments of the invention.
Figure 2B:
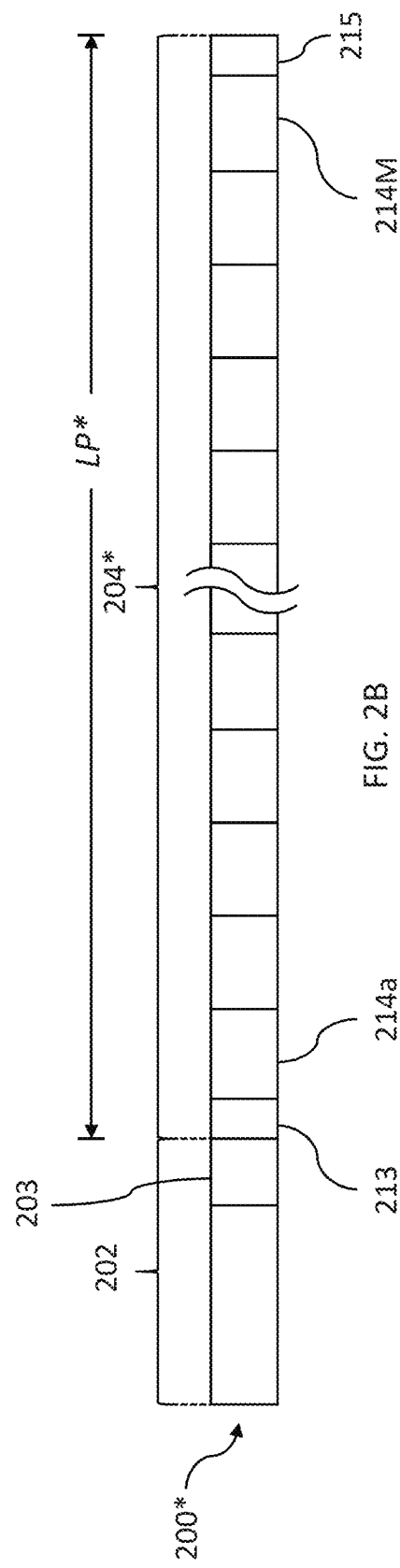

The structure of an advertising packet 200 broadcast by the second and third radio transceiver devices 104, 106 is shown in FIGS. 2A and 2B. FIG. 2A shows the structure of the advertising packet 200 before it is encrypted (i.e. the underlying advertising payload plaintext), and FIG. 2B shows the structure of the encrypted advertising packet 200*.

Prior to encryption, each advertising packet 200 comprises a header portion 202 and a payload portion 204. The BLE specification permits advertising payloads of between 1 and 255 octets.

The payload portion 204 comprises N payload structures 206a-206N of varying length. Each payload structure 206n begins with a one-octet structure length field 208n which indicates the length of the rest of the structure in octets $LS_n$ (i.e. not including the structure length field byte), followed by a structure type field 210n which indicates the type of data carried in the structure, and a structure data field 212n which carries the actual data payload. For instance, an advertising packet 200 may include a payload structure 206n which carries the name of the device broadcasting the packet.

The encrypted advertising packet 200*, shown in FIG. 2B, comprises the unencrypted header portion 202 followed by an encrypted payload portion 204*. The header portion 202 includes a payload length field 203 which indicates the length LP* of the encrypted payload portion 204*. The encrypted payload portion 204* is produced by encrypting the payload portion 204 using 128-bit AES-CCM. This encryption and authentication process produces a 4-octet randomizer 213, M 128 bit encryption blocks 214a-214M in which the N payload structures are encrypted, followed by a 4-octet message integrity code (MIC) 215.

Because the payload structures 206a-206N can be of varying length, each payload structure 206a-206N when encrypted may span multiple encryption blocks 214a-214M. Conversely, an encryption block 214a-214M may contain entirely one or more encrypted payload structures 206a-206N. However, the overall length of the encryption blocks 214a-214M is the same as the overall length of the payload portion 204 (i.e. the ciphertext is the same length as the plaintext).

Figure 3:
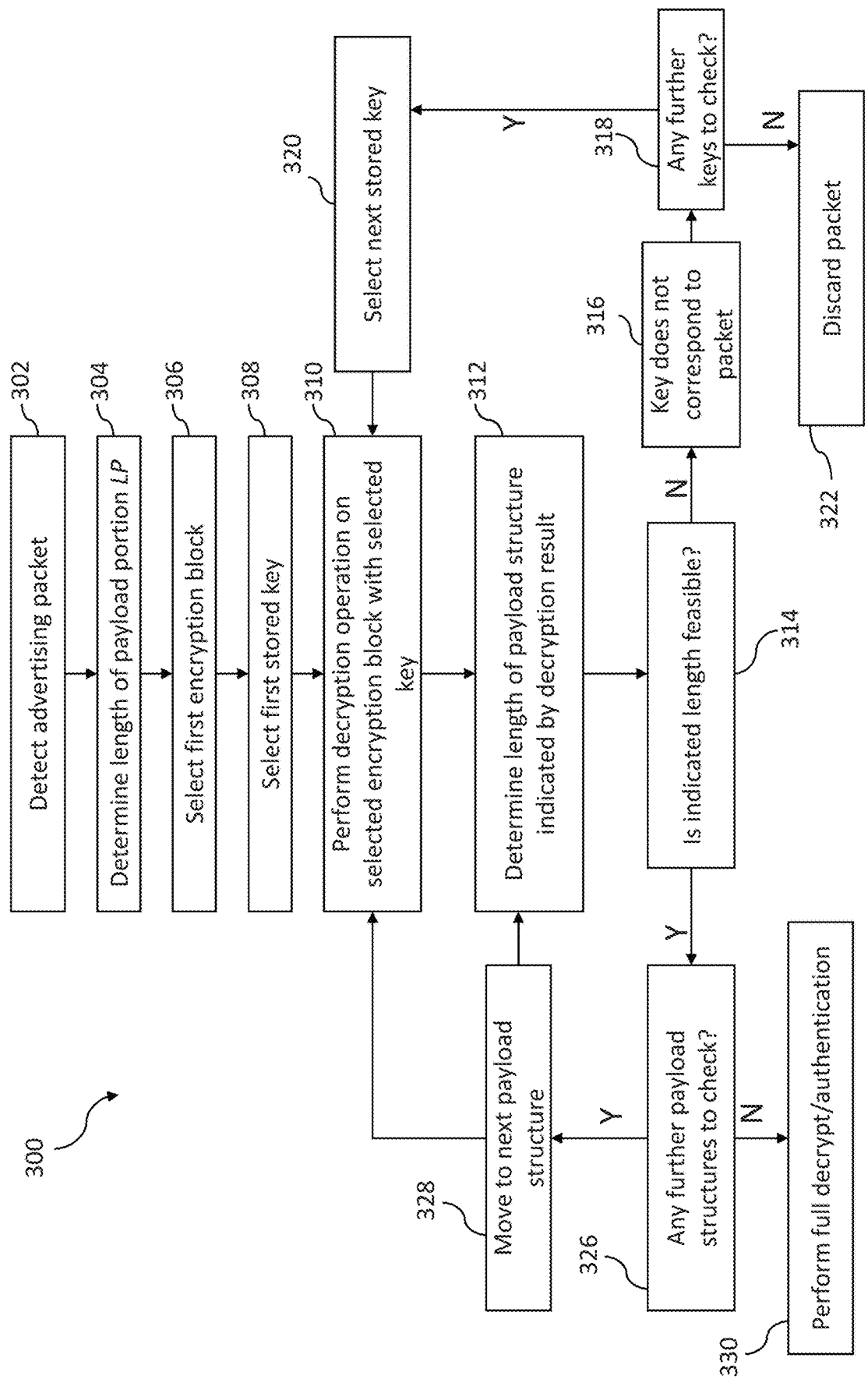
FIG. 3 is a flow diagram illustrating embodiments of the invention.

The operation of the first radio transceiver device 102 will now be described with reference to the flow diagram 300 of FIG. 3. In a first step 302, the first radio transceiver device 102 detects a radio signal comprising an encrypted advertising packet 200* from the second or third radio transceiver device 104, 106. The front-end portion 110 processes the incoming radio signal and provides a bit sequence corresponding to the encrypted advertising packet 200* to the processor 112.

At this stage, because the advertising packet 200* is encrypted, the first radio transceiver device 102 does not know which device the advertising packet 200* is from or whether it has the appropriate cryptographic key to decrypt the advertising packet 200*.

In step 304, the first radio transceiver device 102 reads the unencrypted header portion 202 of the advertising packet 200* and determines the length LP of the payload portion 204 (which is currently encrypted) from the payload length field 203. In this example, LP=30 octets.

In step 306, the radio transceiver device 102 selects the first encryption block 214a of the encrypted payload portion 204*. In step 308, the first radio transceiver device 102 selects a first key 115 from the memory 114 and in step 310 performs a decryption operation on the selected first encryption block 214a using the first key 115 (i.e. the radio transceiver device 102 attempts to decrypt the first encryption block 214a using the first key 115).

The decryption operation produces a decryption result which, if the first key 115 were correct, would contain the beginning of the first payload structure 206a, i.e. the structure length field 208a of the first payload structure 206a.

In step 312, the first radio transceiver device 102 determines the length $LS_a$ of the first payload structure 206a indicated by the decryption result. In other words, the first radio transceiver device 102 determines what value the decryption result indicates for the structure length field 208a.

In step 314, the first radio transceiver device 102 compares the length $LS_a$ of the first payload structure 206a indicated by the decryption result to a set of feasible lengths for the first payload structure 206a. The set of feasible lengths is a range between 1 and the length LP of the unencrypted payload portion 204, because the first payload structure 206a cannot be longer than the whole payload portion 204. The first radio transceiver device 102 determines the length LP of the unencrypted payload portion 204 by subtracting the known length of the randomizer 213 (4 octets) and MIC 215 (4-octets) from the length LP* of the encrypted payload portion 204* indicated in the payload length field 203 of the (unencrypted) header 202. If the first key 115 corresponds is correct for the incoming packet 200*, each payload structure 206n will be decrypted correctly and the indicated lengths will be feasible (because they reflect the actual lengths of the structures). However, if the first key 115 is incorrect, the length $LS_a$ of the first payload structure 206a indicated by the decryption result will simply be a random 8-bit number between 0 and 255.

If the length $LS_a$ of the first payload structure 206a indicated by the decryption result is not within the set of feasible lengths (e.g. if the length $LS_a$ of the first payload structure 206a indicated by the decryption result is equal to zero or greater than LP), the first radio transceiver device 102 can conclude in step 316 that the first key 115 does not correspond to the packet and then proceed to step 318.

However, if the length $LS_a$ of the first payload structure 206a indicated by the decryption result is within the set of feasible lengths (e.g. if the length $LS_a$ of the first payload structure 206a indicated by the decryption result is between 1 and the length LP of the payload portion 204), the first radio transceiver device 102 cannot yet conclude whether the first key 115 does or does not correspond to the packet, and so proceeds to step 326.

In a first example, the encrypted advertising packet 200\* is broadcast by the second radio transceiver device 104 and is encrypted using the second cryptographic key 116. The first key 115 is therefore not the correct key for decrypting the packet 200\*.

In this example, because the first key 115 is not correct, the first decryption result randomly returns a value of 20 octets for the indicated length $LS_a$ of the first payload structure 206a. This is in the set of feasible lengths (i.e. it is between 1 and 30) and so the first radio transceiver device 102 proceeds to step 326. It will be seen that an incorrect key has a ~30/256 (~12%) chance of returning a feasible length.

In step 326, the first radio transceiver device determines if there are any further advertising payload structures 206n in the packet 200. The indicated length for the first payload structure 206a is less than the length of the payload 204, which indicates that there are further payload structures 206n to check.

In step 328, the first radio transceiver device 102 uses the indicated length for the first payload structure 206a to moves to the expected position of the second payload structure 206b in the payload portion. In some cases the indicated start of the second payload structure 206b may be in the same encryption block as the first payload structure 206a, in which case the first radio transceiver device 102 may return straight to step 312. However, in this situation the indicated length $LS_a$ of the first payload structure 206a is 20 octets, i.e. greater than the 128-bit block length. The first radio transceiver device 102 thus selects the next encryption block 214b and moves to step 310, where a decryption operation is performed on the second encryption block 214b using the first key 115.

In step 312, the first radio transceiver device 102 determines the length $LS_b$ of the second payload structure 206b indicated by the corresponding decryption result for the second block 214b and in step 314 compares this to a set of feasible lengths for the second payload structure 206b.

The set of feasible lengths of the second payload structure 206b takes into account the indicated length of the first payload structure (i.e. 20 octets) as well as the length LP of the payload portion 204. The set of feasible lengths of the second payload structure is thus a range between 1 and 10 (LP-$LS_a$). An incorrect key has a ~10/256 (~4%) chance of returning a feasible length for the second payload structure length $LS_b$, meaning that there is <1% chance of an incorrect key returning feasible lengths for the first and second payload structures.

In this example, because the first key 115 is not correct, the second decryption result randomly returns a value of 150 for the length $LS_b$ of the second payload structure 206b. This is not in the set of feasible lengths for the second payload structure and so the first radio transceiver device 102 concludes in step 316 that the first key 115 does not correspond to the packet 200\* and proceeds to step 318.

In step 318, the first radio transceiver device 102 determines if it has any further stored cryptographic keys to check. In step 320, the first radio transceiver device 102 selects the second key 116 and returns to step 310. The first radio transceiver device 102 then repeats steps 310-314 with the second key 116.

Because the second key 116 is correct for the packet 220\* from the second radio transceiver device 104, the lengths $LS_n$ of the payload structures 206n indicated by decryption results are accurate and thus always feasible. The first radio transceiver device 102 repeats steps 310-314 and 326-328 until it reaches the last payload structure 206N. At this point, in step 326 the first radio transceiver device 102 determines that there are no further payload structures 206n left, and moves to step 330.

Because each of the structure lengths indicated from decryption results produced using the second key 116 was feasible, the first radio transceiver device 102 can be confident that it the second key 116 is the correct key for decrypting the advertising packet 200. Therefore, in step 330 the first radio transceiver device authenticates the decrypted packet 200 using the MIC 215 and, if authentication succeeds, proceeds to react appropriately to the advertising packet 200 (e.g. by forming a connection with the second radio transceiver device 104).

In contrast, in a second example the packet 200\* detected by the first radio transceiver device 102 is broadcast by the third radio transceiver device 106 and is encrypted using the fourth cryptographic key 118.

The first radio transceiver device 102 carries out the process described above for each of the first, second and third keys 115, 116 and 117 it has stored. Because none of these keys corresponds to the packet 200\* in this example, it is highly likely that a non-feasible payload structure length will be encountered in step 314 for each of the keys before the end of the encrypted payload portion 204\* is reached. When all the keys 115, 116, 117 available to the first radio transceiver device 102 have been tested and found to not correspond to the packet 200\*, the first radio transceiver device 102 concludes that it will not be able to decrypt the packet 200\* and discards it in step 322 without any further processing.

It will be recognised that this approach may be more efficient than attempting to decrypt and authenticate the entire packet 200\* to determine whether the first radio transceiver device 102 has the correct key available.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating a radio receiver device, the method comprising:
    receiving a radio signal comprising an encrypted advertising packet, said advertising packet comprising a header portion and a payload portion comprising one or more encrypted payload structures;
    determining a length of said payload portion using information contained in the header portion;
    performing a decryption operation using a decryption key on a first section of the payload portion to produce a decryption result for the first section;
    determining a length of a first payload structure of the payload portion indicated by the decryption result for the first section;
    comparing the length of the first payload structure indicated by the decryption result for the first section to a set of feasible lengths for the first payload structure, said set of feasible lengths being based at least partially on the length of the payload portion; and if the length of the first payload structure indicated by the decryption result for the first section is not in the set of feasible lengths for the first payload structure, determining that the decryption key does not correspond to the advertising packet.

2. The method of claim 1, wherein the set of feasible lengths for the first payload structure includes only lengths that are less than or equal to a maximum structure length.

3. The method of claim 2, wherein the maximum structure length is defined relative to the length of the payload portion.

4. The method of claim 1, wherein the set of feasible lengths for the first payload structure includes only lengths that are equal to or above a minimum structure length.

5. The method of claim 4, wherein the minimum structure length is one bit or one octet.

6. The method of claim 1, wherein the decryption operation comprises a block decryption operation.

7. The method of claim 6, wherein the decryption operation applies Advanced Encryption Standard—Counter with cipher block chaining message authentication Mode.

8. The method of claim 1, comprising, in response to a determination that the decryption key does not correspond to the advertising packet, the radio receiver device, disregarding the packet with no or minimal further processing.

9. The method of claim 1, further comprising, in response to determining that the decryption key does not correspond to the advertising packet:
performing a decryption operation using a second decryption key on the first section of the payload portion to produce a second decryption result for the first section;
determining a length of the first payload structure of the payload portion indicated by the second decryption result for the first section;
comparing the length of the first payload structure indicated by the second decryption result for the first section to the set of feasible lengths for the first payload structure; and
if the length of the first payload structure indicated by the second decryption result for the first section is not within the set of feasible lengths, determining that the second decryption key does not correspond to the advertising packet.

10. The method of claim 1, further comprising checking whether one or more further decryption keys corresponds to the advertising packet.

11. The method of claim 10, comprising, if decryption results of all available decryption keys indicate a length of the first payload structure that is not within the set of feasible lengths, dismissing the advertising packet.

12. The method of claim 1, comprising, if the length of the first structure indicated by the first decryption result is within the set of feasible lengths:
identifying a second payload structure of the payload portion;
determining a length of the second payload structure indicated by a decryption result;
comparing the length of the second payload structure indicated by the decryption result to a set of feasible lengths for the second payload structure, said set of feasible lengths being based at least partially on the length of the payload portion; and
if a length of the second payload structure indicated by the decryption result is not within the set of feasible lengths for the second payload structure, determining that the decryption key does not correspond to the advertising packet.

13. The method of claim 12, comprising determining a length of the second payload structure indicated by the decryption result for the first section.

14. The method of claim 12, comprising:
performing a decryption operation using the decryption key on a second section of the payload portion to produce a decryption result for the second section; and
determining a length of the second payload structure indicated by the decryption result for the second section.

15. The method of claim 12, wherein the set of feasible lengths for the second payload structure is based at least partially on the length of the first payload structure indicated by the decryption result for the first section.

16. The method of claim 15, wherein the set of feasible lengths for the second payload structure comprises a maximum length equal to a maximum length for the first payload structure minus the length of the first payload structure indicated by the decryption result for the first section.

17. The method of claim 1, comprising, if the length of the first payload structure indicated by the decryption result for the first section is within the set of feasible lengths for the first payload structure:
identifying one or more further payload structures of the payload portion
determining lengths of said one or more further payload structures of the payload portion indicated by one or more decryption results produced using the decryption key;
comparing the lengths of the one or more further payload structures indicated by the one or more decryption results to one or more respective sets of feasible lengths for said one or more further payload structures, said sets of feasible lengths being based at least partially on the length of the payload portion; and
if a length of a further payload structure indicated by a decryption result for a respective further section is not within a respective set of feasible lengths, determining that the decryption key does not correspond to the advertising packet.

18. The method of claim 17, comprising, if every indicated payload structure length produced using a given decryption key is in a respective set of feasible lengths, determining that the decryption key corresponds to the advertising packet.

19. The method of claim 18 comprising, in response to determining that a decryption key corresponds to the advertising packet, carrying out one or more additional cryptographic processes for the advertising packet.

20. A non-transitory computer-readable recording medium storing instructions that, when executed by a radio receiver device, cause said radio receiver device to perform the method of claim 1.

21. A radio receiver device arranged:
to receive a radio signal comprising an encrypted advertising packet, said advertising packet comprising a header portion and a payload portion comprising one or more encrypted payload structures;
to determine a length of said payload portion using information contained in the header portion;
to perform a decryption operation using a decryption key on a first section of the payload portion to produce a first decryption result for the first section;
to determine a length of a first payload structure of the payload portion indicated by the decryption result for the first section;

to compare the length of the first payload structure indicated by the decryption result for the first section to a set of feasible lengths for the first payload structure, said set of feasible lengths based at least partially on the length of the payload portion; and if the length of the first payload structure indicated by the first decryption result is not within the set of feasible lengths for the first payload structure, to determine that the decryption key does not correspond to the advertising packet.

* * * * *